United States Patent
Walsh et al.

(10) Patent No.: US 9,328,933 B2
(45) Date of Patent: May 3, 2016

(54) EXTERNAL THERMOSTAT FAN CONTROLLER

(71) Applicants: John Walsh, Bozeman, MT (US); Robert J. Mowris, Olympic Valley, CA (US)

(72) Inventors: John Walsh, Bozeman, MT (US); Robert J. Mowris, Olympic Valley, CA (US)

(*) Notice: Subject to any disclaimer, the term of this patent is extended or adjusted under 35 U.S.C. 154(b) by 342 days.

(21) Appl. No.: 14/168,503

(22) Filed: Jan. 30, 2014

(65) Prior Publication Data

US 2014/0191050 A1 Jul. 10, 2014

Related U.S. Application Data

(63) Continuation-in-part of application No. 13/085,119, filed on Apr. 12, 2011, now Pat. No. 8,763,920.

(51) Int. Cl.
*F24D 19/10* (2006.01)
*F24H 9/20* (2006.01)
*G05D 23/19* (2006.01)
*F24F 11/00* (2006.01)

(52) U.S. Cl.
CPC ........ *F24D 19/1084* (2013.01); *F24F 11/0076* (2013.01); *F24H 9/2071* (2013.01); *G05D 23/1951* (2013.01); *F24F 2011/0075* (2013.01)

(58) Field of Classification Search
CPC .............. F24D 19/1084; F24F 11/0076; F24F 11/0079; F24F 2011/0075; F24H 9/2064; F24H 9/2071; G05D 23/1951
See application file for complete search history.

(56) References Cited

U.S. PATENT DOCUMENTS

| | | | |
|---|---|---|---|
| 3,454,073 A | 7/1969 | Man | 165/245 |
| 3,454,078 A | 7/1969 | Elwart | 165/245 |
| 3,489,345 A | 1/1970 | Moreland | 236/11 |
| 3,912,162 A | 10/1975 | Bauer et al. | |
| 4,075,864 A | 2/1978 | Schrader | |
| 4,090,663 A | 5/1978 | Bonnie | 165/289 |
| 4,136,730 A | 1/1979 | Kinsey | |
| 4,167,966 A | 9/1979 | Freeman | 165/254 |
| 4,369,916 A | 1/1983 | Abbey | 236/11 |
| 4,493,194 A | 1/1985 | Briccetti | |
| 4,684,060 A | 8/1987 | Adams et al. | |
| 4,842,044 A | 6/1989 | Flanders et al. | |
| 5,228,307 A | 7/1993 | Koce | |
| 5,248,083 A | 9/1993 | Adams | 236/11 |
| 5,397,970 A | 3/1995 | Rowlette | 318/400.09 |
| 5,882,233 A | 3/1999 | Idehara | |
| 6,282,910 B1* | 9/2001 | Helt | F24F 11/0079 62/229 |
| 6,464,000 B1 | 10/2002 | Kloster | 165/247 |
| 6,684,944 B1 | 2/2004 | Byrnes et al. | |

(Continued)

*Primary Examiner* — Marc Norman
(74) *Attorney, Agent, or Firm* — Kenneth L. Green; Averill & Green (57) ABSTRACT

A method for efficient control of a heater ventilation fan. The method includes switching the heater ventilation fan from low speed to high speed after a brief period P1 following starting, and continuing heater ventilation fan operation for a variable period of time P2 after the heat source has stopped. The period P1 is preferably about four minutes, and the period P2 is determined by the duration of heating and is generally between two and four minutes. Operating the heater ventilation fan at high speed improves heat transfer and efficiency while the heating system is operating, increases warm air movement to the space, satisfies the thermostat set point temperature in less time, reduces heating system operation, and reduces energy use. Continuing heater ventilation fan operation after turn-off maximizes recovery of additional heat from the heat exchanger to improve overall efficiency, extend the off cycle time, and save energy.

18 Claims, 5 Drawing Sheets

(56) References Cited

U.S. PATENT DOCUMENTS

| | | | |
|---|---|---|---|
| 6,695,046 B1 | 2/2004 | Byrnes | 126/110 A |
| 6,940,051 B2 * | 9/2005 | Tateishi | F24H 9/2071 219/486 |
| 7,191,826 B2 * | 3/2007 | Byrnes | F04D 27/00 126/110 A |
| 7,204,429 B2 | 4/2007 | Olney | 236/49.3 |
| 7,240,851 B2 | 7/2007 | Walsh, Jr. | |
| 8,362,725 B2 | 1/2013 | Becerra et al. | |
| 2003/0223172 A1 | 12/2003 | Priest | |
| 2005/0121531 A1 | 6/2005 | Walsh, Jr. | 238/46 R |
| 2010/0187318 A1 | 7/2010 | Yu | |
| 2011/0234368 A1 * | 9/2011 | Huang | G05D 23/1951 340/3.44 |
| 2012/0104108 A1 | 5/2012 | Westberg et al. | |
| 2012/0248211 A1 | 10/2012 | Warren et al. | |

* cited by examiner

| Table 1. Efficient Fan Controller Example Operational Logic Schedule |||
|---|---|---|
| Heating System Operation (minutes) | Fan Time Delay Off (minutes) | Fan Speed |
| Less than 4 minutes | 0 | Low |
| 4 to 5 minutes | 2 minutes | High |
| 5 to 6 minutes | 2.5 minutes | High |
| 6 to 7 minutes | 3 minutes | High |
| 7 to 8 minutes | 3.5 minutes | High |
| 8 minutes or greater | 4 minutes | High |

FIG. 8

EXTERNAL THERMOSTAT FAN CONTROLLER

CROSS-REFERENCE TO RELATED APPLICATIONS

The present application claims the priority of U.S. Provisional Patent Application Ser. No. 61/324,229 filed Apr. 14, 2010 and is a Continuation In Part of U.S. patent application Ser. No. 13/085,119 filed Apr. 12, 2011 and is a Continuation In Part of U.S. patent application Ser. No. 13/427,542 filed Mar. 22, 2012, which applications are incorporated in their entirety herein by reference.

BACKGROUND OF THE INVENTION

The present invention relates to a device for extending the run time of an air conditioning or forced-air furnace fan after the compressor or furnace stops and thereby increasing the cooling/heating output and in the case of air conditioning, increasing the Sensible Energy Efficiency Ratio (SEER).

Heating consumption accounts for 41% of total residential energy use in the United States as reported by the US Energy Information Agency Residential Energy Consumption Survey in 2005. Known central heaters are controlled by a thermostat which turns on a heater ventilation fan after a brief delay following turning on a heat source, and turns off the heater ventilation fan after variable temperature based delay or a fixed time delay following turning off the heat source. Unfortunately, maintaining a low heater ventilation fan speed often results in increased heat soak within the central heating unit and the portion of the heat generated by the heat source is lost to the environment increases the longer the central heating element is on at the low heater ventilation fan speed. Further, the amount of heat soak increases as the central heating unit is operated for longer periods of time leaving significantly higher temperature air (i.e., 110 to 200° F.) in the heat exchanger after the heater ventilation fan is turned off and a portion of this heat is also lost to the environment after the heat source and the heater ventilation fan are tuned off.

U.S. Pat. No. 5,142,880 (Bellis, 1992) discloses a solid state control circuit for use in connection with existing low-voltage thermostat terminals of a central, forced-air, air conditioning system having a compressor and an indoor blower and gas-fired or electrical heating elements. The '880 patent relates generally to systems for increasing the efficiency of air conditioning units by continuing the blower running time after the compressor is turned off. Specifically, the '880 patent claims an air conditioning control unit comprising a low voltage room thermostat fan terminal, a low voltage compressor relay terminal, a timing circuit means, a sensitive gate triac, and a power triac. The '880 patent also claims a method for controlling the on-off time of an indoor fan that is controlled by and associated with an indoor thermostat for a room air conditioning system. The apparatus of the '880 patent is not programmable or adaptable. It does not have a fixed delay from one system to another. The delay is related to the supply voltage, which varies from system to system. Bellis provides constant current to the triac gates on the order of 6 milliamps. The total current draw is even higher than that when all components are included. Many systems have do not accommodate this much current draw through control relays without causing a humming noise which irritates the user. The Bellis design momentarily de-energizes the relay when switch from thermostat driven fan to his delay. This can cause relay chatter and excessive wear. Bellis does not provide for an override function if the unit fails. The Bellis design is a "fixed" delay. The delay does vary with respect to supply voltage, component variation and temperature. Bellis outlines between 3 and 5 minutes for the delay. His device is not programmable or adaptable.

In U.S. Pat. No. 5,882,233 Noto teaches of a device used to extend the fan run time and also periodically activate the fan during times the system is not calling for heating or cooling. Noto requires the circuit to have access to the 24 VAC signals from the AC transformer. This requirement precludes his device from being connected directly to the thermostat since most thermostats do not have both the hot and neutral legs of the transformer. Household wiring only provides the hot (red) signal to the transformer. Although Noto teaches of a range of delays, his invention uses fixed values for the delays. The delays in his invention are not programmable either by a user interface or by system conditions such as the duration of the compressor activation.

U.S. Pat. No. 4,842,044 (Flanders et al., 1989) provides a heating and cooling control system that works by energizing a fan or other fluid circulating device to circulate fluid and effect thermal transfer of energy from the fluid to the spaces being heated and by de-energizing the circulating means at a selected time interval after de-energization of he heating and control system. The '044 patent also claims a heating control system comprising a switching means to effect energization of the fluid circulating means, a switching control means that is energizable in response to operation of the control circuit, and an additional circuit means that energizes the switching control means a selected time interval after de-energization of the heating system. The '044 patent is intended to increase the time the fan is turned on after a heating cycle to improve energy efficiency. Unfortunately, it draws power continuously from the gas solenoid through a 680 ohm resistor, and this method has proven to be problematic in practice. Too much current drawn in this way, can cause a humming noise in the gas valve and even false operation. The patented device also enables the fan relay to activate the blower as soon as the gas valve is activated. This results in cool air being circulated throughout the home since the plenum is not sufficiently warm. Normal heat operation retards the blower until the temperature in the plenum reaches a preset operating temperature. The '044 patent also requires the addition of a relay circuit. This relay must be active the entire time the fan is to be off, creating a significant current draw even when the system is in not calling for heating or cooling. The'044 patent also describes fixed delays. It has no way to adapt the fan delay times either by user input or by the compressor run time. The delays provided by the '044 patent are also subject to the variations of the components selected. Additionally, although Flanders touches on the subject of how his invention works when the fan switch on the thermostat is moved from the AUTO position to the ON position, as described, there is no way for the fan to come on when the homeowner requests.

In U.S. Pat. No. 4,136,703, Kinsey teaches of a device that intervenes with the controls coming from a thermostat and going to the heating/cooling system. His invention places a fixed upper limit to the time that the compressor or heating source can be activated and then his invention adds additional time to the blower fan. This activity can increase the efficiency of an air conditioner system by allowing a certain amount of water to condense on the evaporator coil and then re-evaporating this water to cool the home. The amount of water collected will vary based on the humidity of the ambient air. Having a fixed compressor run time with a fixed blower time can create a less efficient system than the current invention. In many environments, limiting the compressor run time and counting on evaporative cooling to reduce the home's temperature will increase the time required to cool the home. In many cases, the desired set point may never be achieved.

In U.S. Pat. No. 7,240,851 Walsh teaches of a furnace fan timer. His device is strictly a timer with a user programmable interval and duration. His device runs continuously in a never ending loop counting down minutes before operating the fan and then counting the minutes to keep the fan activated. Walsh's device is not compatible with air conditioner systems. Most thermostats connect the fan switch to the air conditioner compressor switch when operating in the automatic fan mode. In systems with air conditioners, Walsh's invention will activate the air conditioner compressor when it turns on the fan. This requires users to turn off the circuit breakers for their air conditioner systems when using his device. Walsh's invention has two interchangeable wire connections. The present invention has at least three wires and each connects to a specific location on the thermostat.

U.S. patent application Ser. No. 13/085,119 filed Apr. 12, 2011 by Walsh and incorporated by reference into the present patent application discloses a system and method for extending fan operation in cooling mode but is not optimized for heating modes.

BRIEF SUMMARY OF THE INVENTION

The present invention addresses the above and other needs by providing an external thermostat fan controller and method for efficient control of a Heating, Ventilation, and Air Conditioning (HVAC) fan. The method includes switching the HVAC fan from low speed to high speed after a brief period P1 following starting, and continuing HVAC fan operation for a variable period of time P2 after the heat source has stopped. The period P1 is preferably about four minutes, and the period P2 is determined by the duration of heating and is generally between two and four minutes. Operating the HVAC fan at high speed improves heat transfer and efficiency while the heating system is operating, increases warm air movement to a conditioned space, satisfies the thermostat set point temperature in less time, reduces heating system operation, and reduces energy use compared to conventional fan controllers. Continuing HVAC fan operation for a short time after turn-off allows recovery of additional heat from a heat exchanger to increase heat delivered to the conditioned space, thereby improve overall efficiency, extend the off cycle time, and save energy.

In accordance with one aspect of the invention, there are provided an external thermostat fan controller and methods for improving HVAC efficiency in heating mode (furnace or heat pump), by increasing fan speed from low to high speed after the HVAC system is operated for sufficient time to provide useful heating (i.e., supply air temperatures above 100 to 110° F.). High speed HVAC fan operation improves heat transfer and efficiency in the heat exchanger and reaches a thermostat setting sooner to reduce furnace operation or heat pump compressor operation. The external thermostat fan controller continues HVAC fan operation after the heating system has stopped operating to recover additional heat from the heat exchanger to increase heat delivered to the conditioned space, improve overall efficiency, extend the off cycle time, and save energy.

In accordance with another aspect of the invention, there are provided an external thermostat fan controller and methods for improving furnace and heat pump heater heat transfer to the conditioned space. The period of heater operation is saved, and continued operation of the HVAC fan, after turning off the heater, is increased for longer periods of heater operation.

In accordance with yet another aspect of the invention, there are provided an external thermostat fan controller and methods for improving furnace heating efficiency of seven to ten percent above conventional temperature delay and six to eight percent above a conventional time delay. For systems with degraded conventional temperature delay sensors, the invention provides improved heating efficiency of seven to 23 percent.

In accordance with yet another aspect of the invention, there is provided a method for improving the efficiency of an air conditioning system. In known HVAC systems, the HVAC fan is turned off simultaneously with the compressor reducing efficiency. The cooling evaporator is very cold then the compressor is turned off. Continuing to run the HVAC fan after the compressor stops provides additional cooling to the conditioned space. Additional cooling is available taking advantage of moisture which has condensed on the evaporator coils. By running the HVAC fan after the compressor has stopped, the moisture is evaporated and the system functions as an evaporative cooler, especially in hot dry climates. Studies have shown a 10-17 percent rise in an air conditioning system EER using an extended time delay on the HVAC fan.

In accordance with still another aspect of the invention, there is provided a method for improving the efficiency of existing HVAC systems. Many new HVAC systems incorporate a fixed delay directly into their new products. The external thermostat fan controller provides such delays to existing HVAC systems.

In accordance with still another aspect of the invention, there is provided an external thermostat fan controller comprising a microprocessor, an AC/DC converter, zero crossing detector, a switching device, and a user interface. The external thermostat fan controller connects directly to existing HVAC thermostat leads with minimal need for rewiring. The external thermostat fan controller receives power present in the HVAC thermostat leads and does not rely on a separate power source. The external thermostat fan controller can operate with a minimum of three leads which can be connected directly to the wiring presently connected to known HVAC thermostats. The external thermostat fan controller generally only requires electrical connection to existing hot and control leads of the thermostat wiring and does not require connection to the neutral leg of the AC transformer. The external thermostat fan controller thus only requires connection to leads present at the HVAC thermostat.

In accordance with still another aspect of the invention, there is provided an external thermostat fan controller and method which does not require an external power source. Known systems require constant 24 VAC power for the use of switching relays. The external thermostat fan controller is connected by as few as three electrical leads connected directly to leads of known thermostats, and a user can program the duration of the extended time delay for the fan, or the device itself can determine the amount of the extended time delay for the fan based on the run time of the compressor or fan switch. In the preferred embodiment, all delay calculations are either done autonomously using an algorithm based on compressor/fan run time, or set by a user manually.

In accordance with still another aspect of the invention, there is provided an external thermostat fan controller providing an extension in the fan run time to increase the efficiency of HVAC systems in air conditioning mode. In most air conditioning systems, the HVAC fan is turned off simultaneously with the compressor, wasting two forms of cooling still available. The cooling evaporator is still very cold then the compressor turns off. Running the HVAC fan after the compressor stops allows this cooling to be captured and delivered into the home. A second type of cooling available is using the moisture which has condensed on the evaporator coils. By running the fan after the compressor has stopped, the moisture is evaporated and the system functions as an evaporative cooler, commonly known as a swamp cooler. Studies have shown a 10-17% rise in an air conditioning system EER using an extended time delay on the fan.

In accordance with still another aspect of the invention, there is provided an external thermostat fan controller easily connected to an existing HVAC system. Many new air conditioning systems incorporate a fixed fax turn off delay directly into their new products, which fixed delays is not present in early designed HVAC systems. The external thermostat fan controller allows the delay to be applied to existing HVAC systems.

In accordance with still another aspect of the invention, there is provided an external thermostat fan controller having a convenient user interface. The user interface can be any form that fits the function, including, but not limited to, an LCD display and keypad, jumpers on the circuit board, or two LEDs and a switch.

In accordance with still another aspect of the invention, there is provided an external thermostat fan controller including a switching device. Many suitable switching devices may be used to provide the requisite function. When the switching device is an electro-mechanical switch, the external thermostat fan controller further includes a battery to power the microprocessor when the switch is closed. In a the preferred embodiment, the switch device is a triac. The external thermostat fan controller selectively gates the triac for milliseconds, and in doing so, has a total current draw on the order of 100 microamps allowing use of the external thermostat fan controller without an additional power source added to the HVAC system. The triac draws very little power when the heating/cooling system is not active since there is no relay to be controlled.

In accordance with still another aspect of the invention, the external thermostat fan controller utilizes a 60 Hz electrical signal as a time base providing precise timing which does not vary from system to system or due to aging or temperature of the components.

In accordance with still another aspect, there is provided an external thermostat fan controller and method which controls the fan relay through the entire cycle without interruption, preventing relay chatter and excessive wear.

In accordance with yet another aspect, the external thermostat fan controller restores all thermostat connections to their original states when turned off, providing continued HVAC system function if the unit fails.

In accordance with another aspect, there is provided an external thermostat fan controller and method allowing a user to program the duration of an extended time delay for the HVAC fan, or the external thermostat fan controller can determine the amount of the extended time delay for the fan based on the run time of the compressor or fan switch. In a preferred embodiment, all delay calculations are either done autonomously using an algorithm based on compressor/fan run time, or done with a single button. In autonomous operation, the extended time delay is based on the length the thermostat called for compressor or fan switch operation or heater operation. In user controlled operation, the extended run time is adjustable based on user selected parameters.

In accordance with yet another aspect, the external thermostat fan controller does not limit the amount of time the compressor operates and thus maintains system efficiency. The present invention relies on the thermostat to determine when the desired set point has been reached, and only then does it extend the fan run time. This ensures the homeowner's comfort and provides for the efficiency gains at the end of the cycle.

In accordance with still another aspect, the external thermostat fan controller does nothing until the thermostat calls for heating or cooling. Once the thermostat calls for cooling or heating, the present invention can extend the fan run time for either a fixed duration or an adaptable duration based on the time the compressor was active.

In accordance with yet another aspect, the external thermostat fan controller works with HVAC systems containing both heating and air conditioning. Known HVAC systems requires a user interface to enter the duration and interval. Once entered, the fan run time is not variable. The external thermostat fan controller may contain a user interface, but does not require one. The external thermostat fan controller measures the amount of time the compressor was active and determines the fan run time automatically. The external thermostat fan controller interrupts the signal from the thermostat to the fan relay and overrides the fan control. The user interface can be any form that fits the function, including, but not limited to, an LCD display and keypad, jumpers on the circuit board, or two LEDs and a switch.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figures 1, 2:
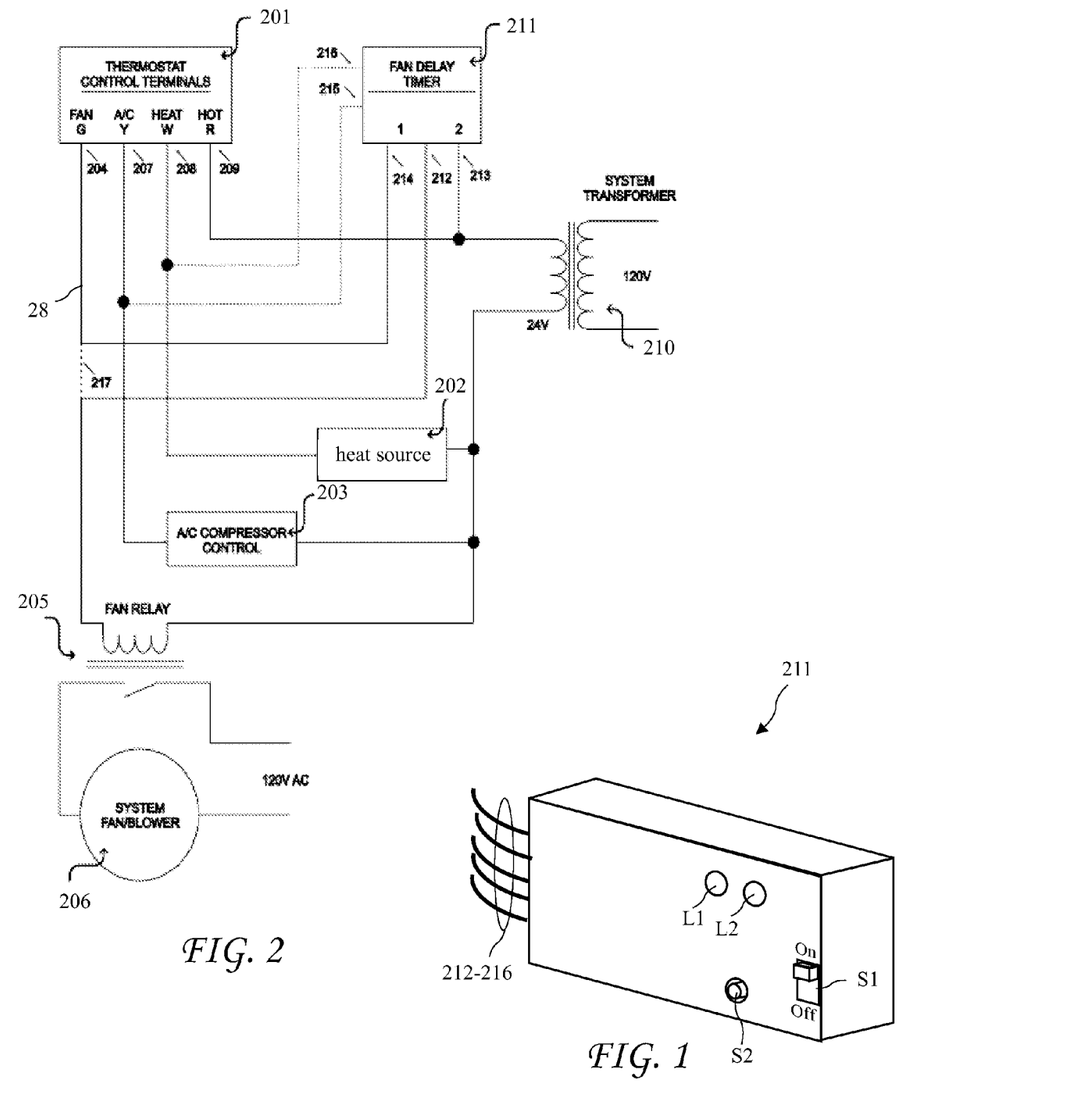
FIG. 1 shows an external thermostat fan controller according to the present invention.
FIG. 2 shows the external thermostat fan controller connected to a Heating, Ventilation, and Air Conditioning (HVAC) system according to the present invention.

FIG. 1 shows an external thermostat fan controller 211 according to the present invention. The external thermostat fan controller 211 connects directly to an existing thermostat 201 (see FIG. 2) fan lead 204, NC lead 207, heater lead 208, and hot lead 209. The external thermostat fan controller 211 can be mounted on the wall near the thermostat or located anywhere else in the house, as long as the external thermostat fan controller 211 can be connected to the thermostat leads.

The external thermostat fan controller 211 includes an ON/OFF switch S1, a programming switch (or button) S2, and indicator lights L1 and L2. The switches and lights facilitate control and programming the external thermostat fan controller 211.

FIG. 2 illustrates, in block diagram form, the connection of the external thermostat fan controller 211 to an existing household thermostat 201. The thermostat 201 is typically connected as shown when the home has a furnace or heat pump control 202 and an air conditioning compressor control 203. Prior to the installation of the external thermostat fan controller 211, the thermostat fan contact terminal 204 connects the thermostat 201 directly to the fan/blower relay 205. When actuated, the fan relay 205 connects the system fan/blower 206 to the 120 VAC. With the addition of the external thermostat fan controller 211, this connection is opened as shown by dashed line 217 and the thermostat terminal 204 is connected to terminal 214 of the external thermostat fan controller 211 and terminal 212 of the external thermostat fan controller 211 is connected to the fan relay 205. The thermostat air conditioning contact terminal 207 connects the thermostat 201 to the air conditioning compressor control 203. The thermostat heater contact terminal 208 connects the thermostat 201 to the furnace or heat pump control 202. The thermostat hot terminal 209 connects the thermostat 201 to the hot side of the 24 volt AC transformer 210.

The external thermostat fan controller 211 lead 216 connects the external thermostat fan controller 211 to the thermostat 201 heater contact terminal 208. In a preferred embodiment no additional power connections are required by the external thermostat fan controller 211, unlike some prior art, which requires either a dedicated connection to the transformer or another relay. The external thermostat fan controller 211 draws power through the fan/blower relay 205.

Figure 3:
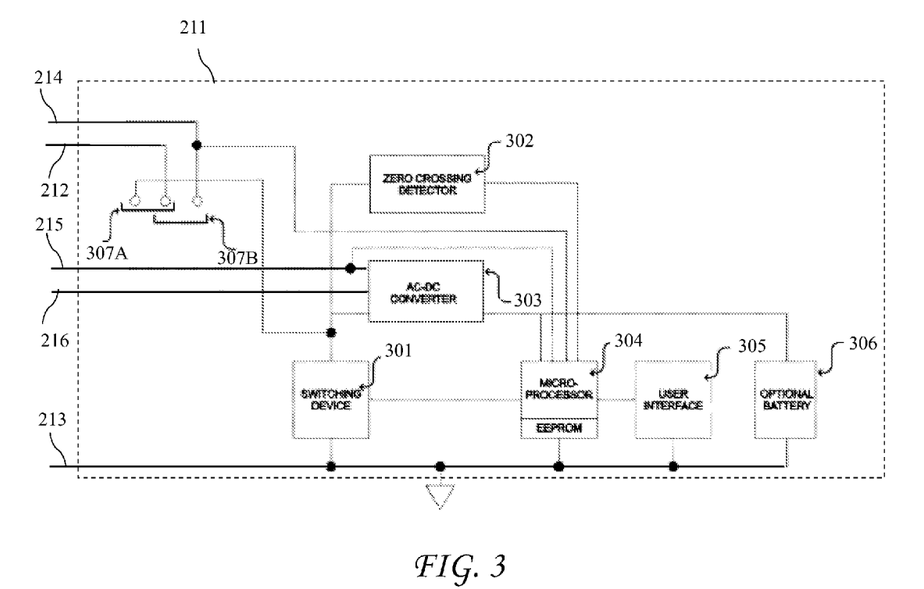
FIG. 3 shows elements of the external thermostat fan controller according to the present invention.

FIG. 3 shows components of the external thermostat fan controller 211. A microprocessor 304 is used to control a switching device 301, and receives input and provides output signals to a user interface 305. The microprocessor 304 receives power from an AC/DC converter 303. The microprocessor 304 may also receive input from an optional zero crossing detector 302, the line from a transformer hot lead terminal 213 electrically connected to the hot contact terminal 209 of the transformer 201, and an A/C compressor lead 215 connected to the thermostat air conditioning contact terminal 207. Because the microprocessor is powered by the AC to DC converter, using an AC signal, the system is free to define hot and neutral as the opposite of what the original installation intended. The device basically "floats" electronically and as a result is able to use the only lead coming to the thermostat (Hot) as a ground. The user interface 305 may be, for example, an LCD display and keypad, at least one LED and one switch, a single button, a software application communicating with or operating on a computer, a smartphone, a tablet, telephony, or any suitable electronic device. The external thermostat fan controller may programmed to operate in fixed delay mode or adaptable delay mode using a single button, or software application, and the programming may be performed using a remotely located device.

The microprocessor 304 performs several major functions. In terms of timing, the microprocessor 304 keeps track of seconds and minutes by either monitoring the AC line signal, or by counting microprocessor clock cycles. Each positive zero crossing accounts for $\frac{1}{60}$th of a second; therefore, sixty positive crossings occur each second. The seconds are then accumulated to keep track of minutes. The negative crossings are also monitored to provide timing for a switching device 301.

The fan controller 211 draws power through the 24 VAC transformer 210 (see FIG. 2). The switching device 301 could be either a standard relay type device, a reed relay or some other electro-mechanical device, and could also be a solid state device such as an FET switch or a triac. In the event that an electro-mechanical switch was used, either an optional battery would be added to power the microprocessor 304 or the additional lines 215 and 216 could provide power when the switch is closed. A preferred embodiment of the present invention using a triac does not require a battery. While an embodiment including a triac switch is shown, the present invention is not limited by the type of switching device. Each switching device requires minor modifications to the baseline design, and each embodiment of the switching device is intended to fall within the scope of the present invention. However, when the switching device 301 is a triac, it must be triggered at each positive and negative zero crossing of the AC line.

The user interface 305 provides inputs to the microprocessor 304, and visual outputs to the user which enable programming the external thermostat fan controller 211. The microprocessor 304 continuously monitors the user interface 305 to determine if there is any change to the current system operation. If a change is requested by the user, the current programming of the switch state is set to neutral (the switching device 301 is turned off) and the user interface 305 is monitored to determine the user's requested action. In a preferred embodiment, the microprocessor contains an EEPROM, which allows the unit to store the user's programming instructions when there is no power applied to the unit.

The AC/DC converter 303 is used to convert the 24 VAC signal on leads 215 and 216 into a DC signal necessary to operate the DC devices within the unit. The zero crossing detector 302 is used to condition the AC input to a level that will not damage the microprocessor 304. The microprocessor 304 generates an interrupt in both the positive going and negative going zero crossings and uses this zero crossing timing to keep track of elapsed time and also to determine when to fire the triac, which may be used as the switching device 301. While this description is based on a triac switch, the present invention is not limited by the type of switching device and the use of a switching device 301 comprising a standard relay, a reed relay or some other electro-mechanical device, or a solid state device such as an FET switch, is intended to come within the scope of the present invention.

The external thermostat fan controller 211 preferably includes four operating modes, each with different user interfaces, that are manifested in the single product and circuit board. The first, mode 1, is a fixed fan timing extension. The fan timing extension could be anywhere from two minutes to mode than ten minutes, but is fixed and constant. Mode 1 requires no special user interface, neither buttons nor LED indicators. The timing delay can be set using jumpers or switches manufactured into the circuit board.

The second mode, mode 2, is an adaptive mode. The processor 304 monitors the duration of the fan 205, AC compressor 203, and/or heater 202 operation by the thermostat 201, and adjusts the delay accordingly. If the AC compressor 203 is run for a short period of time and there is not much condensation on the evaporator, the fan 205 time will be extended for a shorter period of time. Likewise, if the AC compressor 203 has run for a longer period of time, allowing for more condensate, or heater 202 runs longer creating more heart soak, the external thermostat fan controller 211 will cause the fan 205 to run for a longer period of time after the AC compressor 203 or heater 202 has stopped. Timing table and/or algorithms may be modified for particular HVAC system, environments, user preferences, and the like. Mode 2 requires no special user interface, neither buttons nor LED indicators.

Mode 3, is a programmable mode. In a preferred embodiment, the user interface 305 compromises a single switch and a single LED. The user simply inputs the number of minutes to run the fan after the compressor stops by tapping the switch S2 while the external thermostat fan controller 211 is listening for input. While a single button is described here, those skilled in the art will recognize various input switches and external thermostat fan controllers having other types of switches are intended to come within the scope of the present invention.

Figure 6:
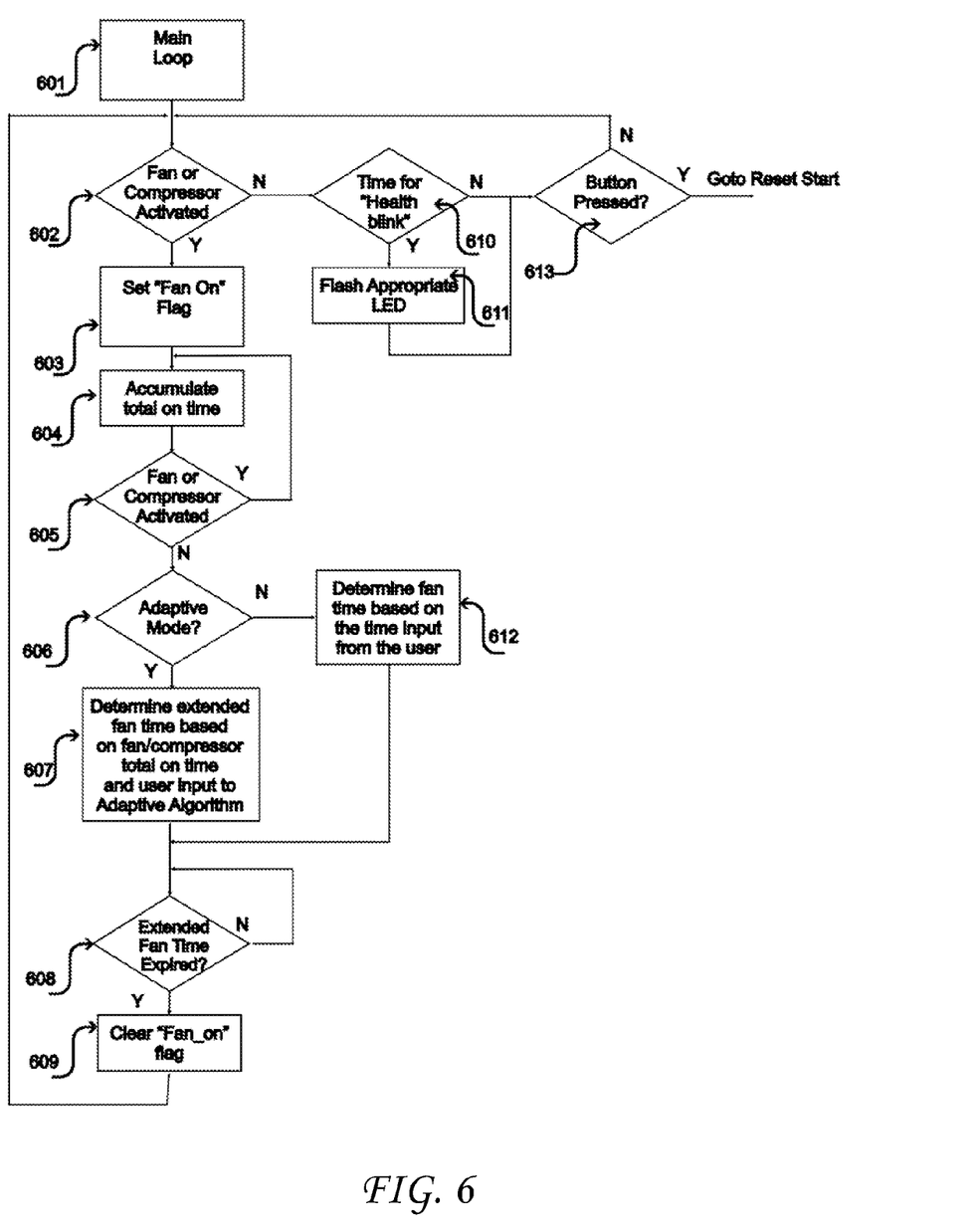
FIG. 6 shows a method of operation of the external thermostat fan controller according to the present invention.

Mode 4, is a combination of mode 2 and mode 3. Mode 4 allows the user to select whether to operate in adaptive mode as in mode 2 or the user may input a number of minutes to run the fan as in mode 3. When mode 4 is set to the adaptive method, the user can input additional parameters to the adaptive algorithm so fine tuning can occur. These additional parameters are input using the same single push button S2 but a different color of LED indicator L1 or L2. This could be a completely different LED or a single LED capable of multiple colors. FIG. 6 shows a detailed flow chart of the interaction between the LEDs L1 and L2 and the switch S2 when operating in mode 4.

Figure 4A:
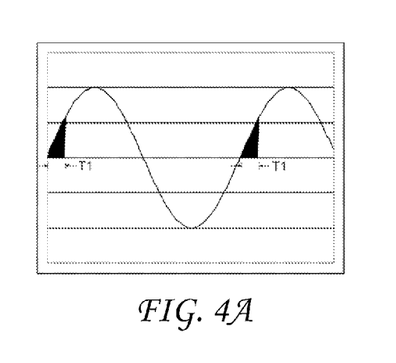
FIG. 4A is a first graph illustrating the timing associated with powering the external thermostat fan controller according to the present invention.
Figure 4B:
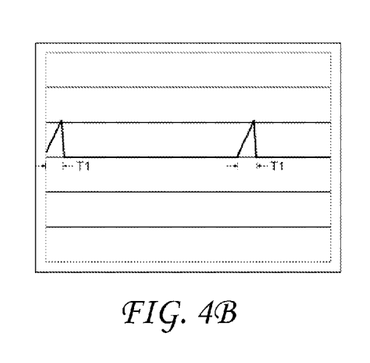
FIG. 4B is a second graph illustrating the timing associated with powering the external thermostat fan controller according to the present invention.

FIGS. 4A and 4B show graphs that illustrate the timing associated with powering the present invention. Because power is drawn through the fan/blower relay 205 (see FIG. 2), when the fan/blower relay is not actuated, 24 VAC is applied to the terminals of the external thermostat fan controller 211. That power is sufficient to drive the external thermostat fan controller 211 and all its components. Normally, to actuate the fan relay, the fan switch must appear closed, in other words, in FIG. 2, the fan contact terminal 204 must be shorted to the hot contact terminal 209. This situation creates a problem for anything that is trying to draw power from these terminals because they are now shorted and there is no power available.

In the embodiment of the external thermostat fan controller 211 using a triac as the switching device 301, the microprocessor 304 does not enable the triac at exactly the zero crossing of the 24 VAC signal. Instead, the microprocessor 304 delays an amount of time into the positive going cycle and allows the positive going waveform to provide a small amount of charge into the AC/DC circuitry. This charge is represented by the dark areas in FIG. 4A. After a small charge has been accumulated, the microprocessor 304 enables the triac to pass the remainder of the power through to the fan relay 205. This occurrence is represented by FIG. 4B. FIGS. 4A and 4B show the AC waveform rising for a short period and then completely shorted out for the duration of the cycle, which passes this energy on to the fan relay 205 and thus actuates it. In this way, the fan relay 205 gets the majority of the AC waveform and actuates, while enough charge is stored by the AC/DC circuitry to keep the microprocessor 304 running until the next positive going cycle of the AC waveform.

In another embodiment of the present invention, a battery 306 could be used to supply power to the microprocessor 304 when the external thermostat fan controller 211 is actuating the fan/blower relay 205. In this situation, the 24 VAC signal would be passed to the fan/blower relay 205. This method is less complex but increases the cost of the invention and adds an item (the battery) that requires maintenance and periodic replacement.

Figure 5:
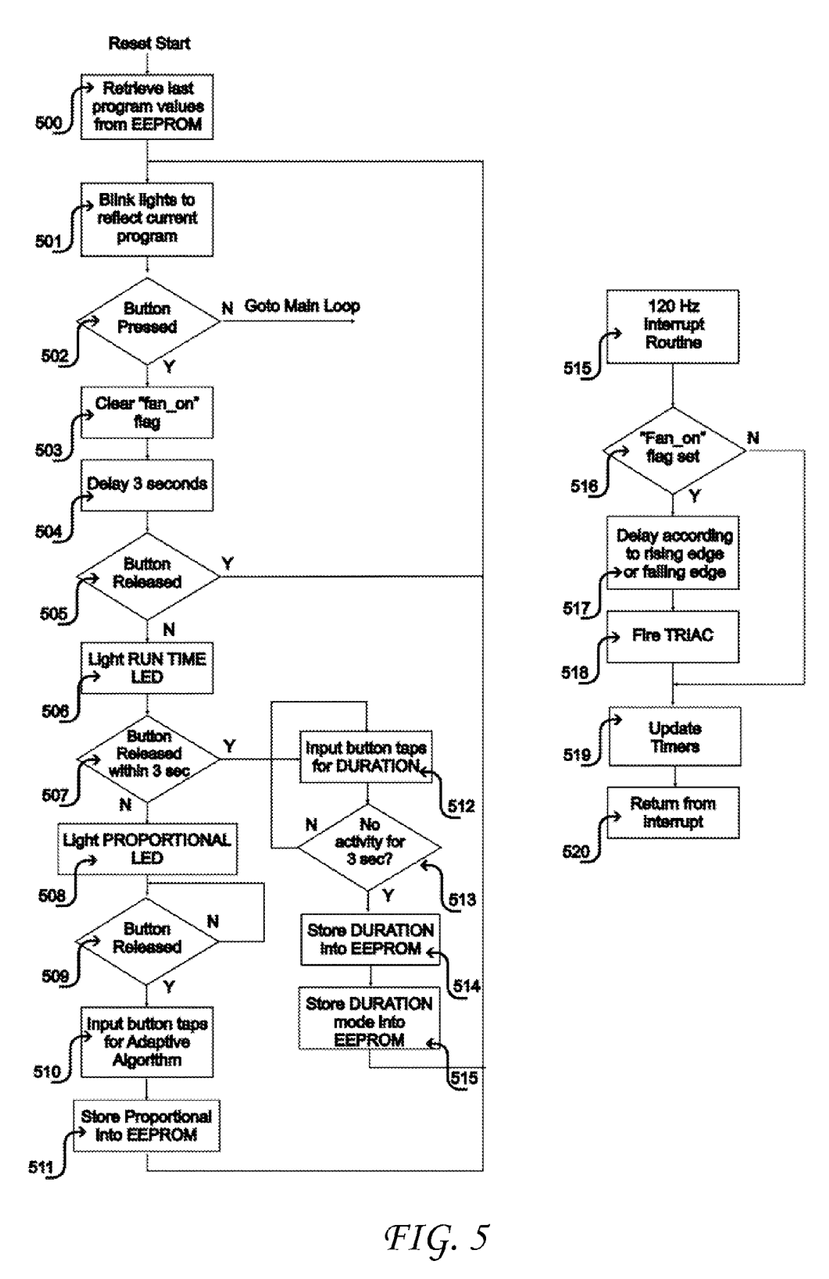
FIG. 5 is a method for programming the external thermostat fan controller according to the present invention.

FIG. 5 shows a method according to the present invention for programming the external thermostat fan controller 211. The programming is for mode 4 of the external thermostat fan controller, the most complicated mode. All other modes are a subset of mode 4 and can be easily achieved by eliminating steps. The routine begins at a hardware reset and then proceeds to the first block 500. The interrupt routine begins at block 515. Block 500 indicates that when power is first applied to the external thermostat fan controller 211, the last stored operating mode and minutes to delay are retrieved from the non-volatile storage, and the external thermostat fan controller 211 is initialized to the last programmed state. Block 501 indicates that the invention will blink the LEDs to visually indicate the last programmed state. If the device was last in a user selected delay mode, the green LED will blink to indicate the number of minutes the user last entered as a delay. If the device was last in an adaptive mode, the unit will blink the red LED to reflect the parameters entered into the adaptive algorithm.

Decision block 502 is used to determine if the user would like to enter device information, or just go to the main loop. If decision block 502 determines that there is a button pressed, then the routine proceeds to block 503 and immediately clears the fan on flag, which causes the fan to be turned off at the next interrupt. The external thermostat fan controller 211 then delays for three seconds as indicated in block 504. The button is again tested as shown in decision block 505. If the button was released before the three seconds are up, then the programming loop is aborted, and the unit restarts at block 501.

If the button was held down for a period of time, for example, at least three seconds, as indicated in decision block 505, it is clear that the user wishes to change the programming. The green "Duration" LED is illuminated shown in block 506, which indicates to the user that the invention is ready to accept button taps as programming input for the run time delay. Once the green "Duration" LED is illuminated, the unit begins another three-second internal controller. If the user releases the button within three seconds of seeing the green LED illuminated, as determined in decision block 507, then the routine enters the "Duration" programming mode as shown in blocks 512 through 514.

Block 512 indicates that the user now taps the programming button from 0 to 96 times, which internally is interpreted as the number of one minute periods that the external thermostat fan controller 211 will elongate the fan operation. In other words, if the user taps the button four times, the external thermostat fan controller 211 will keep the fan active for four minutes after the compressor has stopped. Block 514 indicates that after the user has tapped in the number of one minute periods of fan time extension and released the button for three seconds, the invention stores the new program into the non-volatile storage as indicated in block 514 and then restarts from the beginning at block 501. If the user enters the programming mode and at any step does not enter any button taps, the external thermostat fan controller 211 will revert to the last number of taps that was stored in the non-volatile memory for the duration.

In addition to the function described above, block 507 also determines if the button was not released within a period of time, for example, three seconds, of when the green "Duration" LED was illuminated. Continuing to depress the programming button after the green "Duration" LED was illuminated indicates to the external thermostat fan controller 211 that the user wishes to skip the duration programming and proceed to program the adaptive algorithm parameters. The external thermostat fan controller 211 indicates that it is ready to accept adaptive algorithm parameters by extinguishing the green "Duration" LED and illuminating the red "Adaptive" LED. This is indicated in block 508 and is the signal to the user that adaptive algorithm parameters are ready to be programmed. This programmability allows multiple inputs to the adaptive algorithm such as a multiplier to the baseline adaptive delay.

At decision block 509, the external thermostat fan controller 211 waits for the user to release the programming button. Block 510 is used to count the number of taps the user enters for the adaptive algorithm parameters. For instance, there can be four pre-set adaptive algorithm parameters, and the user taps the button once, twice, three or four times to indicate which setting would be optimal for the current cooling configuration. Block 511 stores the new adaptive algorithm parameters into the non-volatile memory, and the unit restarts from the start at block 501.

Block 515 indicates the beginning of an interrupt routine. This routine is entered at the rising and falling zero crossings of the 24 VAC signal. The interrupt routine first determines if the fan is scheduled to be on in decision block 516. If not, the routine merely updates internal controllers 519 by counting the number of 60 Hz transitions on the 24 VAC power input line.

After delaying the amount of time into the interrupt cycle based on rising or falling edge as shown in block 517, block 518 fires the triac, and the remainder of the 24 VAC signal is passed on to the fan relay, thus energizing the relay for this 60 Hz cycle. The interrupt routine then follows the actions as described above by updating the internal controllers, block 519. Block 520 returns from the interrupt to the calling routine.

FIG. 6 shows a method of operation of the external thermostat fan controller. Block 601 is the start of the main loop. Block 602 is used to determine if the fan or compressor is activated by the thermostat. If neither are activated, the routine uses block 610 to determine if it is time to blink either the red or green led to indicate the unit is on and in a healthy state as shown in block 611. The external thermostat fan controller 211 then determines if the switch S2 was pressed. If so, it is an indication that the user would like to change some of the parameters and the unit restarts itself and prepares to input button presses. If block 602 determines that the thermostat is calling for the fan to be activated, block 603 sets the "fan on" flag. This flag is a indicator to the interrupt routine that the switching device 301 should be activated on the next rising edge of the 60 Hz signal. The routine then accumulates the total time the thermostat is calling for the fan to be active as shown in block 604. This is accumulated value is input to the adaptive algorithm to automatically determine the extended fan run time based on the time the thermostat called for the fan to be on.

Decision block 605 simply looks to see it the thermostat is calling for the fan to be activated, either through the fan switch, or the optional connection to the thermostat cooling contact 207. If the fan is still active, simply accumulate more time. Decision block 606 determines if the invention is in adaptive mode or programmable mode. If in programmable mode, block 612 looks up the number of minutes the user entered and drops into a loop to keep the fan on for that number of minutes. If the invention is in adaptive mode, the total time the fan was activated by the thermostat and the user input parameters are entered into an algorithm to determine the duration to keep the fan on. A simple algorithm, block 607, could take the form of a look up table as shown in Table 1 below:

TABLE 1

Fan run time extension based on user selectable parameters

| Thermostat Fan on time | User Parameter 1 | User Parameter 2 | User Parameter 3 | User Parameter 3 |
|---|---|---|---|---|
| 0-5 min | 1.5 | 2 | 2.5 | 3 |
| 5-10 min | 3 | 4 | 5 | 6 |
| 10-15 min | 4.5 | 6 | 7.5 | 9 |
| 15+ min | 6 | 8 | 10 | 12 |

Figure 7:
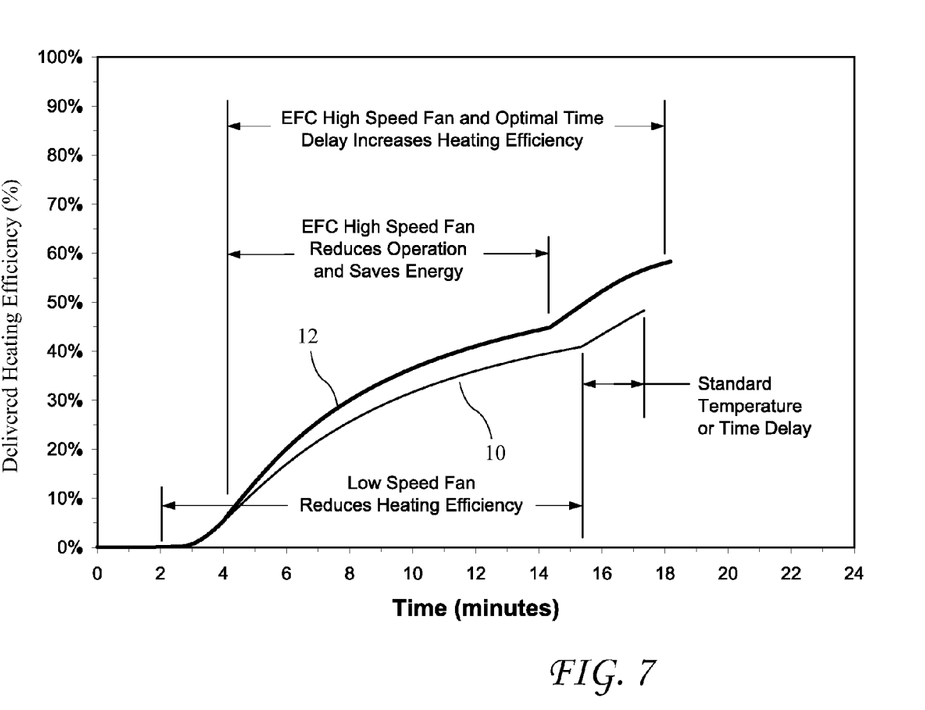
FIG. 7 shows a graph of known control, and efficient fan control according to the present invention.

A graph comparing known control 10 and efficient fan control 12 provided by the external thermostat fan controller 211 is shown in FIG. 7. The efficient fan control 12 optimizes heating system efficiency and reduces electric or gas furnace or heat pump compressor operation by increasing fan speed from low to high four minutes after the heating system is turned on. The efficient fan control 12 further maximizes heat recovery from the heat exchanger after the heating system is turned off with an extended fan delay of two to four minutes, depending on how long the heating system was on during the heating cycle. Conventional time or temperature fan off delay control 10 leave significantly higher temperature air (i.e., 110 to 200° F.) in the heat exchanger which wastes energy.

Figure 8:
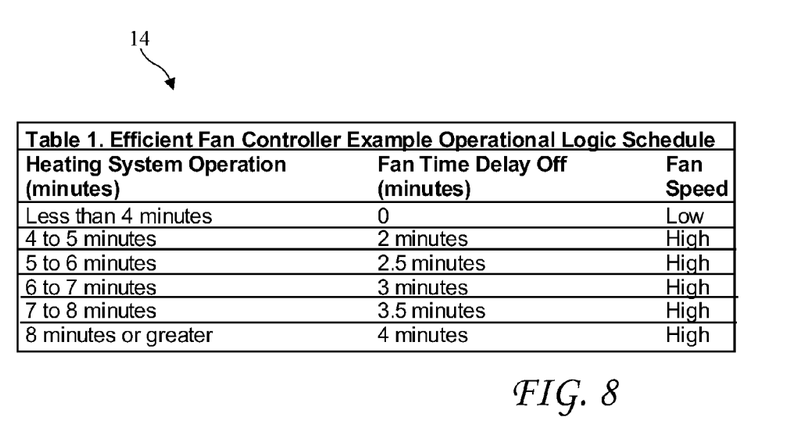
FIG. 8 is a table of extended fan operation after shut-off period as a function of the duration of heater system operation, according to the present invention.

A table 14 of extended fan operation after shut-off period, as a function of the duration of heater system operation, according to the present invention, is shown in FIG. 8. For less than four minutes of operation, no significant amount of heat has been stored in the heat exchanger. Between four and eight minutes of operation, varying amounts of heat have been stored in the heat exchanger. For greater than eight minutes of operation, a steady state amount of heat has been stored in the heat exchanger. The fan off delay is matched to the amount of heat stored in the heat exchanger to extract that heat.

While the invention herein disclosed has been described by means of specific embodiments and applications thereof, numerous modifications and variations could be made thereto by those skilled in the art without departing from the scope of the invention set forth in the claims.

We claim:
1. A method for efficiently controlling a heater ventilation fan, the method comprising:
   electrically connecting an external thermostat fan controller to thermostat leads of an existing HVAC system;
   turning on a heat source in a heater;
   turning on the heater ventilation fan to low speed;
   waiting a first period of time P1;
   switching the heater ventilation fan to high speed after the period of time P1;
   running the heater for a period of time P3 until a selected temperature is reached;
   turning off the heat source in the heater;
   waiting a second period of time P2;
   turning the heater ventilation fan off after the period of time P2.

2. The method of claim 1, wherein the period P1 is about four minutes.

3. The method of claim 2, wherein the period P2 is determined by the period of time P3.

4. The method of claim 3, wherein the period P2 is increased when the period of time P3 increases.

5. The method of claim 4, wherein the period P2 increases to four minutes if the period of time P3 is greater than eight minutes.

6. The method of claim 5, wherein the period P2 increases from zero minutes to four minutes as the period of time P3 increases from four minutes to eight minutes.

7. The method of claim 5, wherein the period P2 is:
zero minutes if P3 is less than four minutes;
two minutes if P3 is between four and five minutes;
two and one half minutes if P3 is between five and six minutes;
three minutes if P3 is between six and seven minutes;
three and one half minutes if P3 is between seven and eight minutes; and
four minutes if P3 is greater than eight minutes.

8. The method of claim 1, wherein electrically connecting an external thermostat fan controller to existing thermostat leads of an existing HVAC system comprises:
positioning the external thermostat fan controller;
disconnecting a fan relay lead originally connecting a thermostat fan terminal to a fan relay controlling a fan, from the thermostat fan terminal;
reconnecting the fan relay lead to a fan activation switch terminal of the external thermostat fan controller;
connecting the thermostat fan terminal to a fan terminal on the external thermostat fan controller;
leaving an original AC compressor lead in place between an AC compressor terminal of the thermostat and an AC compressor; and
leaving a power signal lead in place between a transformer and the thermostat.

9. The method of claim 8, wherein the external thermostat fan controller does not include a user interface.

10. The method of claim 8, further including a step of connecting a sole power signal for the external thermostat fan controller in parallel with a hot contact terminal of the thermostat.

11. The method of claim 8, wherein the external thermostat fan controller includes a user interface selected from the group consisting of:
an LCD display and keypad;
at least one LED and one switch; and
a software application.

12. The method of claim 8, wherein the user interface communicates with a remotely-located device.

13. The method of claim 8, further including programming the external thermostat fan controller using a single button.

14. The method of claim 8, further including the external thermostat fan controller determining whether it is operating in fixed delay mode or adaptable delay mode, wherein both the fixed and adaptable mode can be programmed with a single button, or software application, and the programming may be performed using a remotely located device.

15. The method of claim 8, wherein the external thermostat fan controller includes a triac, and including a step of switching the fan relay on and off by the triac.

16. The method of claim 1, wherein the external thermostat fan controller includes an electro-mechanical switch, a microprocessor controlling the external thermostat fan controller, and including a step of switching the fan relay on and off by the electro-mechanical switch.

17. A method for efficiently controlling a heater ventilation fan, the method comprising:
electrically connecting an external thermostat fan controller, including a trial as a switching device, to existing thermostat leads of an existing HVAC system, comprising the steps of:
positioning the external thermostat fan controller;
disconnecting a fan relay lead originally connecting a thermostat fan terminal to a fan relay controlling a fan, from the thermostat fan terminal;
reconnecting the fan relay lead to a fan activation switch terminal of the external thermostat fan controller;
connecting the thermostat fan terminal to a fan terminal on the external thermostat fan controller;
leaving an original AC compressor lead in place between an AC compressor terminal of the thermostat and an AC compressor; and
leaving a power signal lead in place between a transformer and the thermostat;
turning on a heat source in a heater;
turning on the heater ventilation fan to low speed;
waiting a first period of time P1 of about four minutes;
switching the heater ventilation fan to high speed after the period of time P1;
running the heater for a period of time P3 until a selected temperature is reached;
turning off the heat source in the heater;
waiting a second period of time P2, wherein P2 is:
zero minutes if P3 is less than four minutes;
linearly increase from zero minutes to four minutes as P3 increases from four minutes to eight minutes; and
four minutes if P3 is greater than eight minutes; and
turning the heater ventilation fan off after the period of time P2.

18. A method for efficiently controlling a heater ventilation fan, the method comprising:
electrically connecting an external thermostat fan controller to existing thermostat leads of an existing HVAC system, wherein all of the power requirements of the external thermostat fan controller are provided though the existing thermostat leads;
turning on a heat source in a heater;
turning on the heater ventilation fan to low speed;
waiting a first period of time P1 of about four minutes;
switching the heater ventilation fan to high speed after the period of time P1;
running the heater for a period of time P3 until a selected temperature is reached;
turning off the heat source in the heater;
waiting a second period of time P2, wherein P2 is:
zero minutes if P3 is less than four minutes;
two minutes if P3 is between four and five minutes;
two and one half minutes if P3 is between five and six minutes;
three minutes if P3 is between six and seven minutes;
three and one half minutes if P3 is between seven and eight minutes; and
four minutes if P3 is greater than eight minutes; and
turning the heater ventilation fan off after the period of time P2.

* * * * *